United States Patent [19]
Tomiyama

[11] Patent Number: 5,898,577
[45] Date of Patent: Apr. 27, 1999

[54] WIRELESS TRANSMITTER

[75] Inventor: Yasuaki Tomiyama, Kanagawa, Japan

[73] Assignee: Sony Corporation, Tokyo, Japan

[21] Appl. No.: 08/803,751

[22] Filed: Feb. 21, 1997

[30] Foreign Application Priority Data

Feb. 28, 1996 [JP] Japan .................................. 8-041913

[51] Int. Cl.⁶ ............................................... H02M 3/338
[52] U.S. Cl. ............................................. 363/19; 363/22
[58] Field of Search .................................. 363/16–26, 81, 363/84, 95, 125, 127, 131–134

[56] References Cited

U.S. PATENT DOCUMENTS

| | | | |
|---|---|---|---|
| 3,671,842 | 6/1972 | McKeown | 363/20 |
| 4,087,850 | 5/1978 | Koizumi | 363/21 |
| 4,092,709 | 5/1978 | Voigt et al. | 363/18 |
| 4,121,282 | 10/1978 | Ohsawa | 363/21 |
| 4,712,170 | 12/1987 | Grace | 363/98 |
| 5,161,241 | 11/1992 | Kanai | 363/65 |
| 5,428,521 | 6/1995 | Kigawa et al. | 363/22 |
| 5,436,550 | 7/1995 | Arakawa | 323/222 |
| 5,448,466 | 9/1995 | Erckert | 363/16 |
| 5,638,262 | 6/1997 | Brown | 363/21 |

FOREIGN PATENT DOCUMENTS

| | | |
|---|---|---|
| 0599244 | 6/1994 | European Pat. Off. . |
| 6339271 | 12/1994 | Japan . |
| 7222441 | 8/1995 | Japan . |
| 7295663 | 11/1995 | Japan . |

*Primary Examiner*—Adolf Deneke Berhane
*Attorney, Agent, or Firm*—Jay H. Maioli

[57] ABSTRACT

An oscillator includes a converter, an oscillation transistor, a resistor, a capacitor and a primary coil of a transformer, and a rectifier includes a secondary coil of the transformer, resistors, capacitors, and a rectifying transistor. Control of the converter is carried out by the configuration of a capacitor, resistors and a transistor. A ripple filter includes a choke coil and ripple capacitors, and a converter activation part comprises a switch interlocked with a power supply switch and an activation diode. A ripple capacitor is also provided on the primary side of the converter. The battery is directly coupled to the primary side of the transformer.

2 Claims, 6 Drawing Sheets

WIRELESS TRANSMITTER

BACKGROUND OF THE INVENTION

The present invention relates to a power supply circuit using a battery as a power supply and raising the voltage of this battery, and more particularly relates to a power supply circuit for a wireless transmitter which keeps supplying power to a load for a prescribed period of time after a switching off operation of the power supply circuit.

In recent years, the progress towards compact, portable electronic equipment has been accompanied by the widespread need for power supplies to be comprised of a single battery. However, in spite of developments which have been enabling electronic components or IC's etc. to be operated with a voltage of a single battery, few electronic equipments are capable of controlling all of their operations with a low voltage of, for example, 1.5 volts. Consequently, power supplying in most of such equipments has been carried out by boosting this low voltage up to the high-voltage required for their circuits.

Further, electronic equipment also exists where, when the power supply is turned off after use, it is necessary for the circuits to be made to operate for a prescribed time so that all circuit operations can be completed. For example, in the case of a wireless transmitter, when use is over, a signal indicating that "the transmission side power supply is OFF" is sent from the receiving side when the power supply is turned OFF, the receiver audio mute circuit is made to operate and the occurrence of unnecessary noise is prevented, i.e. after the power supply is OFF, a voltage is maintained for a prescribed period of time and the transmitter is made to operate, and demands for power supplies having a function where the voltage is maintained for a prescribed period of time after the power supply is OFF are therefore increasing.

Next, the aforementioned related power supply circuit example is described with reference to FIG. 1 and FIG. 2.

First, in a first related example shown in FIG. 1, a transistor Q11 is provided across a battery 4 and a DC-DC converter 13, with the DC-DC converter 13 being controlled by the transistor Q11.

When the power supply is on so that a power supply switch S11 is turned ON, a capacitor C11 starts to charge, with a charge voltage VC11 finally reaching a battery voltage EQ. Further, a base voltage VB of a transistor Q12 becomes the voltage VC11 divided by a resistor R13 and a resistor R14 (the internal resistance of the battery is considered to be 0 for simplicity) in a manner such that the voltage VB becomes:

$$VB = VC11 \cdot R14/(R13+R14) \qquad (1).$$

Here, the transistor Q12 becomes ON when this base voltage VE exceeds a voltage VBE across the base and emitter of the transistor Q12, current is drawn out from the transistor Q11, transistor Q11 is made to go ON, and a voltage is supplied to the DC-DC converter 13. This supplied voltage is then converted to a prescribed voltage and supplied to the load circuit.

Next, when the power supply switch S11 is put OFF in order to break the power supply, the discharge of the load stored at the capacitor C11 starts via resistors R13 and R14. At this time, the discharge voltage VC11 becomes:

$$VC11 = E0 \exp[-1/C11(R13+R14)]t \qquad (2),$$

and the base voltage of the transistor Q12 becomes the voltage VC11 divided by resistor R13 and resistor R14 so as to become:

$$VB = E0 \exp[-1/C11(R13+R14)]t \times R14/(R13+R14) \qquad (3).$$

The transistor Q12 then goes off when this base voltage VB becomes lower than the voltage VBE across the base and emitter of transistor Q12 after a time t1. The transistor Q11 therefore also becomes OFF and the operation of the DC-DC converter 13 is halted.

Namely, at the power supply circuit of the aforementioned configuration, after the power supply switch S11 goes OFF, the operation of the DC-DC converter 13 continues until the passage of time t1, and the supplying of power to the load circuit is possible.

Here, it is necessary for a base current of Ib to flow in order to make the transistor Q11 functioning as an electronic switch go ON. However, it is necessary for the relationship:

$$Ib \times hfe > Ic \qquad (4)$$

hfe: current amplification factor to be fulfilled in order for a sufficient current Ic to flow under stable conditions.

When the DC-DC converter 13 is activated, a rush current several times larger than under normal conditions flows and a base current Ib therefore has to be set to maintain this activation. Further, because hfe fluctuates a great deal, this margin has to be maintained and a base current Ib having a margin with respect to the temperature characteristics has to be made to flow. This effectively usually means that a null current flows and power supply efficiency is lowered.

Next, in a second related example shown in FIG. 2, the transistor Q11 of the first related example is replaced with a Field Effect Transistor (hereinafter referred to simple as "FET") Q21, with other aspects of the configuration and operation then being the same as the first related example. An FET is a voltage-controlled element and control current can therefore be reduced when compared with transistors. The null current is therefore lowered and the efficiency of the power supply can therefore be improved. There is, however, a problem whereby efficiency deteriorates if the ON resistance of the FET is made large so that the input voltage of the DC-DC converter falls. It is therefore difficult to drive current general-purpose FETs using a voltage from a single battery because the VGS ON voltage of current general-purpose FETs is high.

In the aforementioned related example, a transistor Q11 or an FET Q21 for switching use is added to a primary side input path but resulting voltage drops cannot be prevented and power supply efficiency deteriorates, particularly when the primary power supply voltage is low.

A configuration where a battery is directly connected to the primary side input can also be considered. In this case, efficient utilization of the input power is possible but there is the fear of current leaking to the secondary circuitry. Namely, when rectification is carried out by a simple diode, a current path can still be made from the battery 4 to the secondary circuitry via the diode as a result of the voltage of the battery 4 even when the power supply switch 11 is OFF and the operation of the DC-DC converter 13 is halted. When the power supply switch S11 is OFF over long periods of time the battery 4 is consumed quickly.

It is therefore the object of the present invention to provide a power supply circuit capable of efficiently raising the efficiency of a low voltage of a battery etc. used as a power supply in electronic equipment for use with load circuitry within the electronic equipment operating at a higher voltage rather than the low voltage and capable of supplying a voltage to the load circuitry for a prescribed period of time after the power supply has been switched off.

SUMMARY OF THE INVENTION

In order to resolve the aforementioned problems, in a wireless transmitter of the present invention uses a battery as a power supply and uses a power supply circuit to raise the voltage of said battery, the power supply circuit comprises an oscillating circuit, a rectification circuit and a controller. The oscillating circuit is capable of being activated and halted. The rectification circuit is for rectifying an oscillation output of the oscillating circuit. The controller is for carrying out a rectification operation when the oscillating circuit is oscillating and discontinuing a rectification path when the oscillating circuit is not oscillating. The battery is directly coupled to the oscillating circuit.

Further, in order to resolve the aforementioned problems, the controller has time constant setting means and the oscillating circuit and rectification circuit are made to operate after said power supply is switched off for a prescribed period of time decided by said time constant setting means.

Therefore, in the power supply circuit of the present invention, a battery and the primary side circuit of a DC-DC converter are directly coupled. The null current of the semiconductor element occurring at the related power supply circuit and voltage drops due to the ON resistance of the semiconductor element can therefore be prevented as can falls in conversion efficiency. Further, current leakage to the secondary circuitry when the power supply switch is OFF can be removed by a rectification circuit synchronized with the DC-DC converter.

DETAILED DESCRIPTION OF THE PREFERRED EMBODIMENTS

First Embodiment

Figure 1:
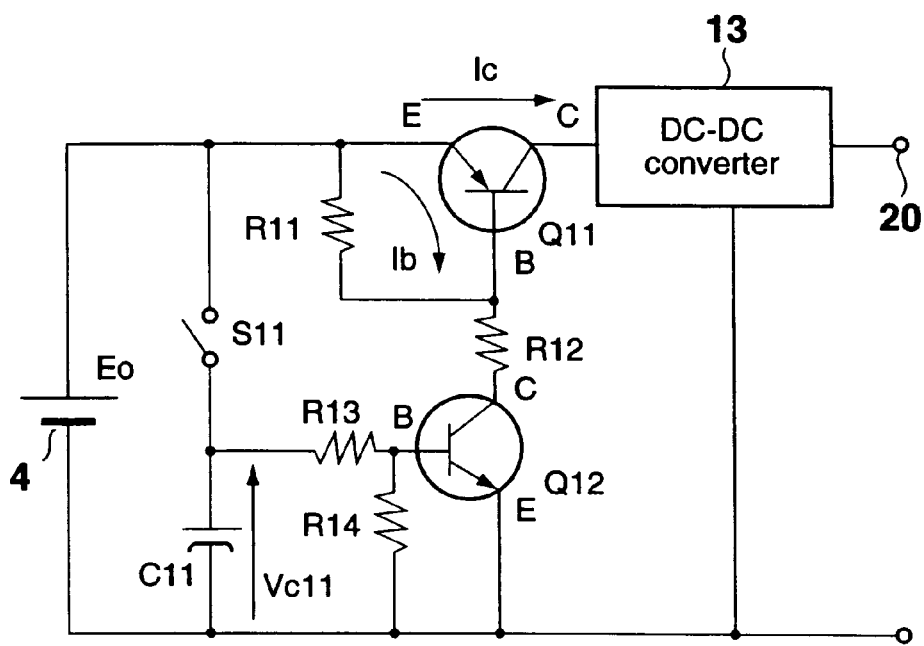
FIG. 1 is a first related example of a power supply circuit.
Figure 2:
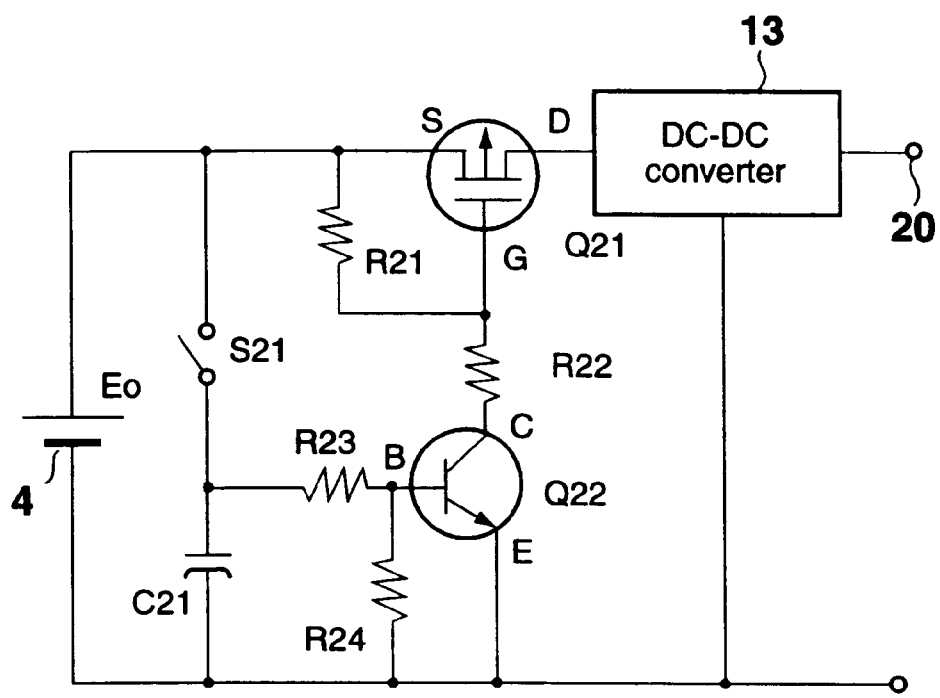
FIG. 2 is a second related example of a power supply circuit.
Figure 3:
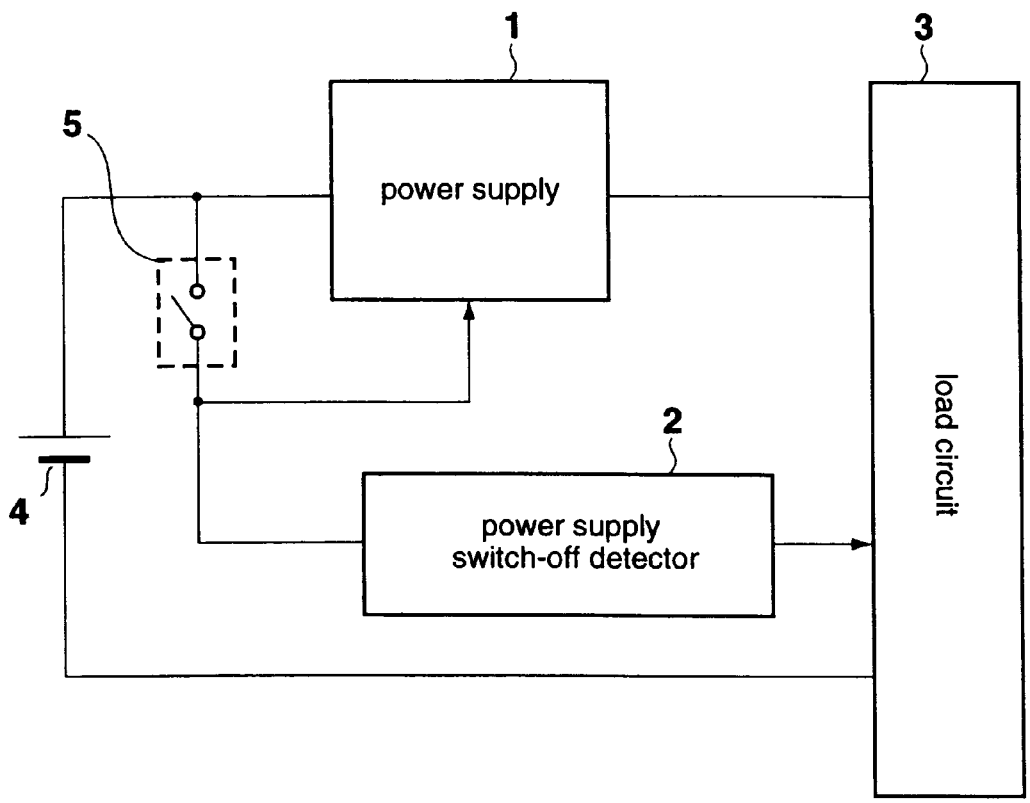
FIG. 3 is a view illustrating the system configuration of a power supply circuit according to the present invention and a device using this power supply circuit.
Figure 4:
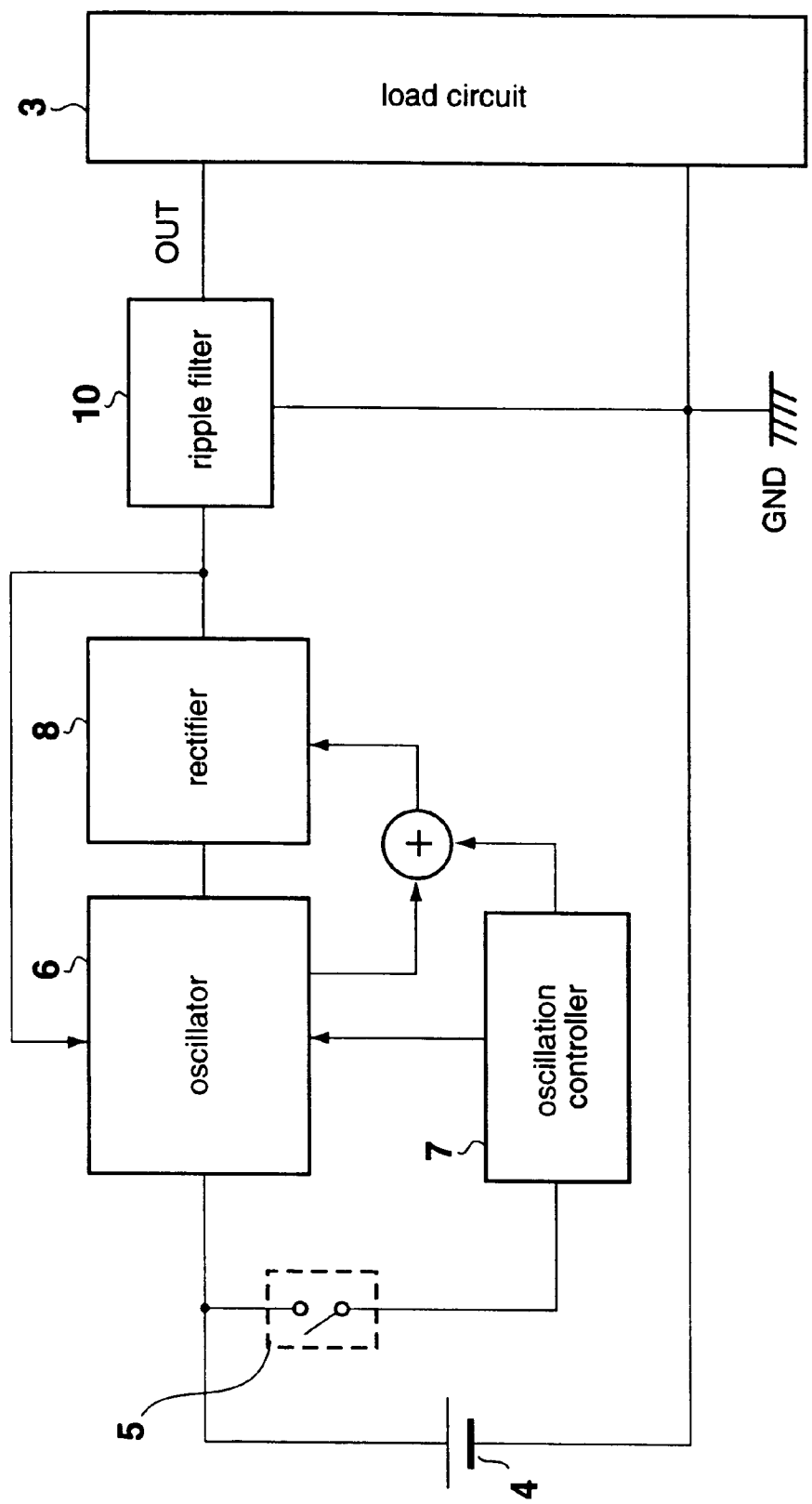
FIG. 4 is a block view illustrating the configuration of a power supply circuit according to the present invention.
Figure 5:
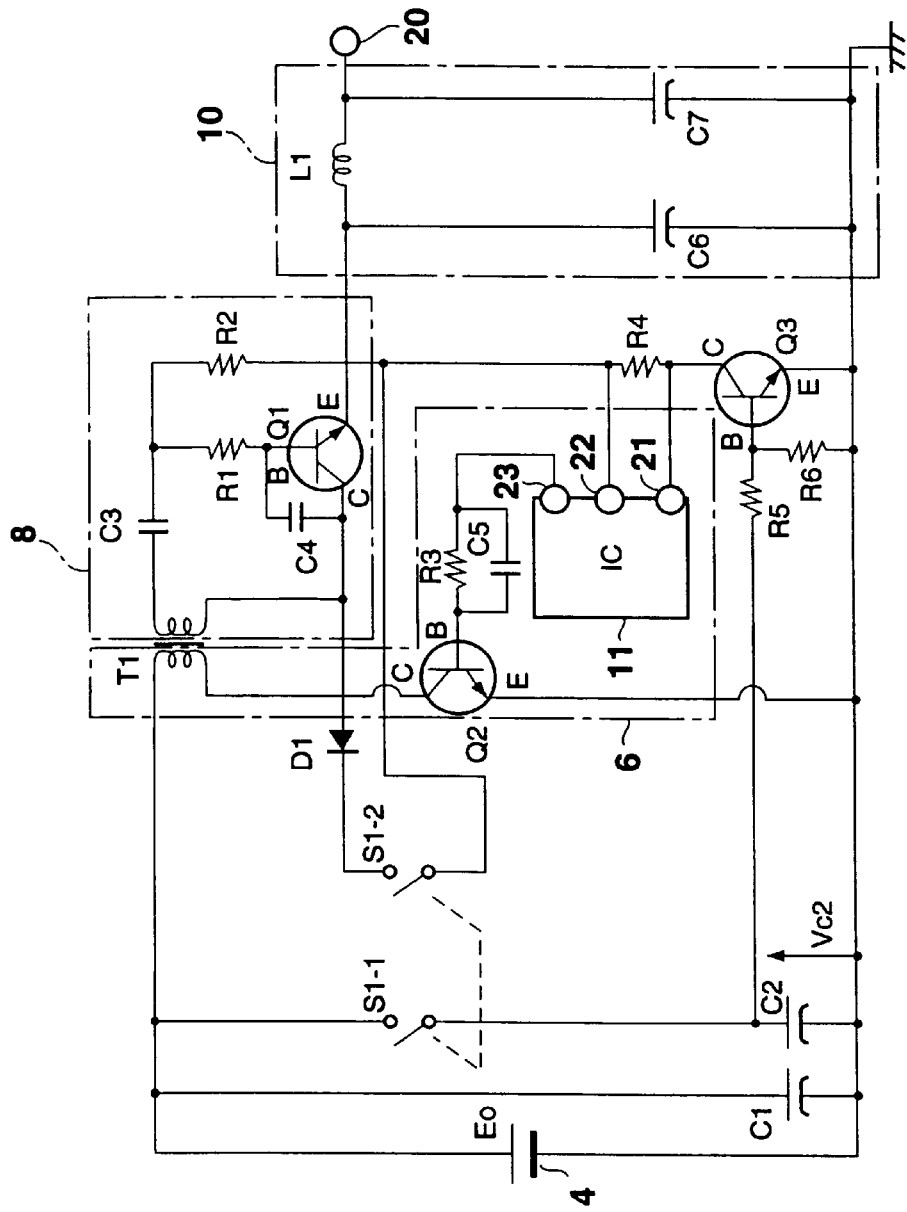
FIG. 5 is an example of the first embodiment of the power supply circuit according to the present invention.
Figure 6:
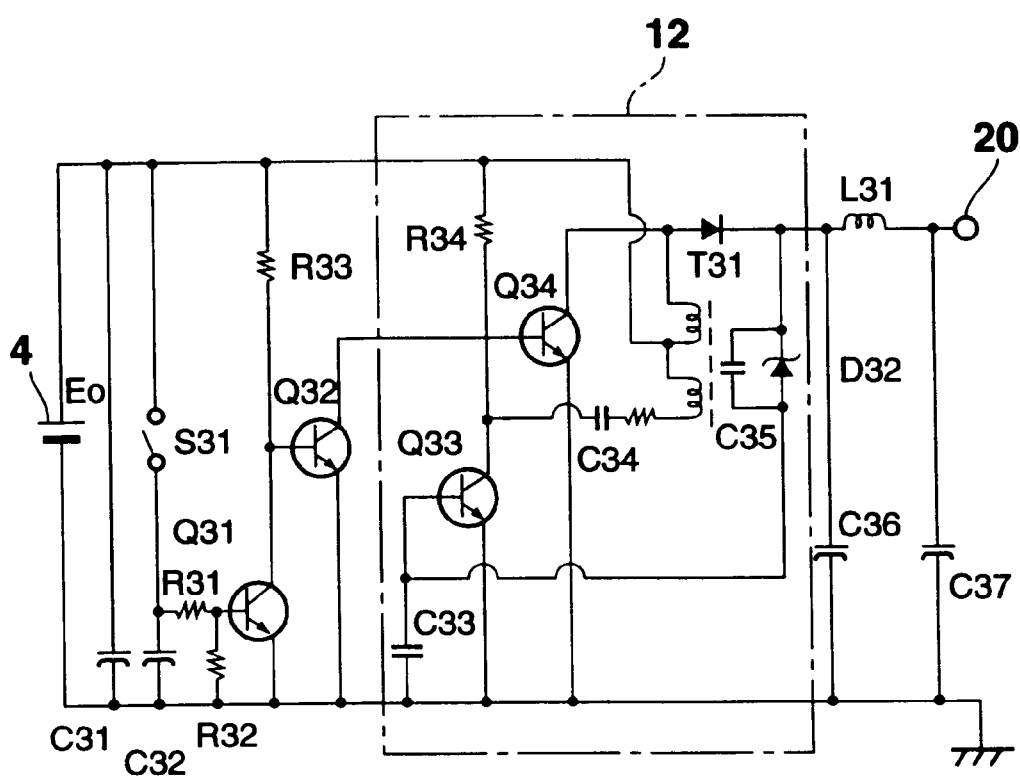
FIG. 6 is an example of a second embodiment of the power supply circuit according to the present invention.

A description will now be given of the embodiments of the power supply circuit according to the present invention with reference to FIG. 3 through FIG. 6. FIG. 3 is a view illustrating the system configuration of the power supply according to the present invention and a device using this power supply. FIG. 4 is a block view showing the configuration of this power supply circuit. FIG. 5 is an example of a first embodiment of a power supply circuit of the present invention. FIG. 6 is an example of a second embodiment of a power supply circuit of the present invention.

An example of a device necessary for carrying out operations a prescribed time after the power supply is turned OFF will now be described with reference to FIG. 3. This device is the kind of device that sends a signal showing that the power supply of the transmitter has gone OFF to the side of the signal receiver when the power supply is OFF when usage of the wireless transmitter has stopped, causes the audio muting circuit of the receiver to operate and prevents the occurrence of unnecessary noise, etc.

The power supply 1 converts the voltage of the battery 4 to the voltage necessary for operating a load circuit 3 with the power supply switch 5 in the closed (ON) state and supplies this voltage to the load circuit 3. The load circuit 3 carries out prescribed operations while the necessary voltage is being supplied. When the power supply switch 5 is opened (OFF), the load circuit 3 carries out the processes necessary when the power supply goes OFF based on the signal for the power supply switch-off detector 2, after which operations are halted. The power supply 1 is configured in such a manner as to continue supplying the voltage while the load circuit 3 is carrying out processes necessary when the power supply goes off, after the power supply switch 5 is turned off.

Next, the block structure of the power supply circuit according to the present invention will be described with reference to FIG. 4. The battery 4 is taken as the power supply, and operations of the entire device are started and stopped by the power supply switch 5. An oscillator 6 is capable of being operated and halted externally, switches the voltage of the battery 4, and makes a conversion to the voltage required by the load circuit 3. An oscillation controller 7 controls operating and halting of the oscillator 6 using the state of the power supply switch 5. A rectifier 8 rectifies in synchronization with the operation of the oscillator 6 and a ripple filter 10 removes unnecessary ripple components from the output voltage from the rectifier 8.

Next, the operation will be described. First, when the power supply is turned ON, a signal is received from the oscillation controller 7 and the oscillator 6 is activated. The oscillator 6 then switches the voltage of the battery 4 while detecting the value of the output voltage so that a stipulated voltage is obtained. The rectifier 8 then starts operation based on the signal for the oscillator 6 or the oscillation controller 7, ripple components are removed from the obtained d.c. voltage by passing this voltage through the ripple filter 10 and this voltage is then supplied to the load circuit 3.

When the power supply is turned off, if the power supply switch 5 is turned OFF, an operation halt signal is sent to the oscillator 6 after a prescribed period of time by equipping the oscillation controller 7 with a time constant circuit. Operation is then continued until an operation halt signal is received by the oscillator 6 and the rectifier 8 and a voltage is continually supplied to the load circuit 3. When the oscillator 6 is halted by an operation halt signal, the rectifier 8 also stops the rectification circuit. That is, the circuit voltage of the load circuit 3 is kept for a period determined by the time constant of the time constant circuit in the oscillation controller 7.

In the above configuration, the operating and halting of the oscillator 6 is not a switch method using a semiconductor element but rather the oscillator 6 and the battery 4 are directly coupled, with the efficiency of power consumption therefore being improved as a result. Further, leakage current when the power supply is OFF can be removed by using the rectifier 8 which operates in synchronization with the operation of the oscillator 6.

Next, an embodiment of a power supply circuit according to the present invention will be described.

In an example configuration of the first embodiment, as shown in FIG. 5, the oscillator 6 comprises a converter IC11, an oscillation transistor Q2, a resistor R3, a capacitor C5 and the primary coil of transformer T1, and the rectifier 8 comprises the secondary coil of transformer T1, resistors R1 and R2, capacitors C3 and C4, and rectifying transistor Q1. Control of the converter IC11 is carried out by the configuration of the capacitor C2, resistors R5 and R6, and the transistor Q3. The ripple filter 10 comprises a choke coil L1 and ripple capacitors C6 and C7, and a converter activation part comprises a switch S1-2 interlocked with the power supply switch S1-1 and an activation diode D1. A ripple capacitor is also provided on the primary side of the converter 1.

The operation of this circuit will now be described. First, at the time of activation, the interlocked power supply switches S1-1 and S1-2 are closed and the voltage from the battery 4 is applied from the primary coil of the transistor T1 to an OUT terminal 22 of the converter IC11 via the diode D1. At the same time, this voltage is applied to the base of transistor Q3 via the resistor R5 charging the capacitor C2 and the transistor Q3 is made to go ON. As a result, a CE terminal 21 of the converter IC 11 goes Low and the converter IC11 goes ON. The resistor R6 forms a discharge circuit for the capacitor C2 together with the resistor R5. Further, when the capacitor C2 is discharging, the base input of the transistor Q3 provides a high impedance and erroneous operations are prevented.

Next, regarding the operation of the converter, the converter IC11 is made active in the way described above, and the oscillation pulse of EXT 23 switches the transistor Q2 via the parallel resistor R3 and the capacitor C5. The pulse waveform occurring at the primary coil of the transformer T1 due to the transistor Q2 is captured by the secondary coil of the transformer T1 through induction and the base of the rectification transistor Q1 is switched. The transistor Q1 therefore rectifies the aforementioned pulse waveform occurring at the collector side as a result of this operation and a d.c. voltage having ripples is obtained on the emitter side. The d.c. voltage is then again applied to the OUT terminal 22 of the converter IC11 and the converter operation continues. The d.c. voltage obtained in this way is then applied to the load circuit after removal of unnecessary ripples using the ripple filter 10.

When the power supply goes OFF, the power supply switches S1-1 and S1-2 are opened in unison. The switch S1-2 is for activating the power supply in the way described above and is therefore unrelated to the operation thereafter. On the other hand, the charge path for the capacitor C2 is broken by opening the power supply switch S1-1 and discharge of the load charged at the capacitor C2 starts via the resistors R5 and R6.

In the same way as for the example described in the related art, the discharge voltage VC2 becomes:

$$VC2 = E0 \exp[-1/C2(R5+R6)]t \quad (4)$$

and the base voltage VB of transistor Q3 which is the voltage VC2 divided by the resistors R5 and R6 becomes:

$$VB = E0 \exp[-1/C2(R5+R6)]t \times R6/(R5+R6) \quad (5).$$

When this base voltage VB falls below a voltage VBE across the base and emitter at a time t1, the transistor Q3 goes OFF. That instant, the maintained converter output voltage is applied to the collector of transistor Q3 and the CE terminal 21 of the converter IC11 via the resistor R4, the CE terminal 21 becomes High and the oscillation operation of the converter IC 11 halts. After this, the logic of the CE terminal 21 becomes unclear or the converter remains in a halt state because the switch S1-2 is open. The time t1 from the power supply switch S1-1 being closed until the converter is actually halted is then the circuit voltage retention time, i.e. in the power supply circuit of the aforementioned configuration, the converter continues to operate after the power supply switch S1-2 has been turned off until the passage of the time t1 and a voltage can be supplied to the load circuit.

Second Embodiment

Next, a second embodiment is described with reference to FIG. 6. This example is the present invention applied to a self-oscillating method power supply.

Transistors Q31 and Q32, resistors R31, R32 and R33, and capacitors C31 and C32 are added to the self-oscillating method DC-DC converter 12. The capacitor C32 and resistors R31 and R32 are for deciding the time the voltage is supplied to the load circuit after switch S31 has been turned OFF, in the same way as for that described above. The transistor Q31 goes ON/OFF in response to it's base voltage, with the transistor Q32 controlling the oscillation and halting of the self-oscillating method DC converter 12. The capacitor C31 is a capacitor for removing input side ripples, with an output side ripple filter being comprised of a choke coil L31 and capacitors C36 and C37.

Next, the operation will be described. When the power supply goes ON and the switch S31 is closed, the capacitor C32 starts to charge. When the base voltage VB of the transistor Q31 becomes higher than the voltage VBE across the base and emitter, the transistor Q31 goes ON. The base of the transistor Q32 is therefore at zero potential and the transistor Q32 goes OFF. The transistor Q32 then goes open collector, and usual operation of the self-oscillating method DC-DC converter 12 begins.

When the switch S31 is opened and the power supply goes OFF, discharge from the capacitor C32 starts via resistors R31 and R32. The time in which this discharge voltage dissipates is the same as that shown in the first example. After a prescribed period of time, when the base voltage VB of the transistor Q31 becomes lower than the voltage VBE across the base and emitter, the transistor Q31 goes OFF and the base of transistor Q32 goes high so that transistor Q32 goes ON, with the collector of transistor Q32 therefore becoming of zero potential as a result. The base of the transistor Q33 of the self-oscillating part is therefore forced to zero potential, the operation of the self-oscillating method DC-DC converter 12 is halted, and the load dispatched to the load circuit is also halted, i.e. a load is dispatched to the load circuit from when the switch S31 is opened and the power supply is turned OFF until the discharge voltage becomes of a prescribed voltage.

Further, in the first and second embodiments, examples were given using resistors R and capacitors C as the time constant circuits but it can be easily understood that it is also possible to use means such as a so-called timer etc. employing a personal computer as the time constant circuits.

In the power supply circuit of the present invention, the battery and the primary circuit of the converter are directly coupled. The null currents and voltage drops due to the ON resistance due to the semiconductor element conventionally used for switching are therefore removed and voltage conversion efficiency is improved.

Leakage current to the secondary-side circuitry when the power supply switch goes OFF can be removed by the rectification circuit that interrupts in synchronization with the DC-DC converter.

Necessary voltages continue to be supplied to the load circuit for a prescribed period of time after the power supply switch goes OFF.

What is claimed is:

1. A power supply circuit for a wireless transmitter using a battery as a power supply and using a power supply circuit to raise a voltage of said battery, said power supply circuit comprising:

an oscillating circuit having an activation state and a halt state;

a rectification circuit for rectifying an oscillation output of said oscillating circuit; and a controller for carrying out a rectification operation when said oscillating circuit is in said activation state and discontinuing said rectification operation when said oscillating circuit is in said halt state, wherein said battery is directly coupled to said oscillating circuit.

2. A power supply circuit for a wireless transmitter according to claim 1, wherein said controller has time constant setting means and said oscillating circuit and said rectification circuit operate after said power supply is switched off for a prescribed period of time in accordance with said time constant setting means.

* * * * *